United States Patent [19]

Rahe

[11] Patent Number: 4,733,471
[45] Date of Patent: Mar. 29, 1988

[54] TOOL DRIVE ASSEMBLY AND CLAMP
[75] Inventor: Jon A. Rahe, El Toro, Calif.
[73] Assignee: Hawaiian Motor Co., Long Beach, Calif.
[21] Appl. No.: 821,122
[22] Filed: Jan. 21, 1986

Related U.S. Application Data

[63] Continuation of Ser. No. 608,332, May 8, 1984, abandoned.
[51] Int. Cl.$^4$ .................................................. B26B 7/00
[52] U.S. Cl. .................................. 30/276; 30/296 R; 403/312; 464/182
[58] Field of Search .......................... 464/52, 57, 182; 403/302, 223, 331, 312; 30/276, 296 R, 296 A

[56] References Cited

U.S. PATENT DOCUMENTS

| | | | |
|---|---|---|---|
| 78,827 | 6/1868 | Porter | 403/312 |
| 455,396 | 7/1891 | Grace . | |
| 501,731 | 7/1893 | Priest . | |
| 713,135 | 11/1902 | Murdock . | |
| 736,378 | 8/1903 | Gay . | |
| 907,539 | 12/1908 | Thomas . | |
| 1,559,546 | 11/1925 | Bosket | 403/312 |
| 1,636,087 | 7/1927 | Wuelker . | |
| 1,656,992 | 1/1928 | Schwemlein . | |
| 1,677,375 | 7/1928 | Tapley . | |
| 1,695,564 | 2/1929 | Thomas . | |
| 2,327,951 | 10/1941 | Zaleske | 287/104 |
| 2,425,992 | 6/1945 | Cadwallader . | |
| 3,068,665 | 12/1962 | Firth . | |
| 3,080,185 | 10/1960 | Walker | 287/104 |
| 3,583,356 | 6/1971 | Barker | 115/34 |
| 3,815,380 | 6/1974 | Esmay | 464/182 X |
| 3,851,983 | 12/1974 | MacKenzie | 403/312 |
| 4,397,088 | 8/1983 | Hampel | 38/296 R |
| 4,463,498 | 8/1984 | Everts | 30/296 R |

Primary Examiner—Douglas D. Watts
Attorney, Agent, or Firm—Nilsson, Robbins, Dalgarn, Berliner, Carson & Wurst

[57] ABSTRACT

A self-coupling split-shaft drive assembly for a tool provides for assembly by a user and start-up without concern over the proper or improper orientation of the two shafts. The drive assembly includes components to secure the two shafts for start-up and use independently of whether an orientation condition exists for their rotational coupling to one another. A shaft coupling mechanism then accomplishes the coupling where an improper condition exists after the securing, in response to the initiation of the rotation of the driver shaft by the motor. The coupling mechanism employs a driver shaft which, with a shaft socket, for receiving the driven shaft, slides back and forth, against a spring and then under the recoil force of the spring, in providing for the securing under an improper orientation condition and the subsequent coupling upon start-up. A split clamp, which is used on a driver shaft tube and driven shaft tube is particularly adapted for rapid, easily accomplished and, at the same time, extremely sturdy clamping of elongated members such as the shaft tubes. The clamp employs a pair of clamp member which are formed, with respect to the elongated members, to a designed clamp face separation of less than or equal to about 3.4 percent and greater than or equal to about 0.5 percent of the diameter for the elongated members, among other significant features. Manually tightened and loosened connectors for one end of the clamp members and tool-operated tightening and loosening at the other end signifcantly contribute to the indicated goals.

16 Claims, 14 Drawing Figures

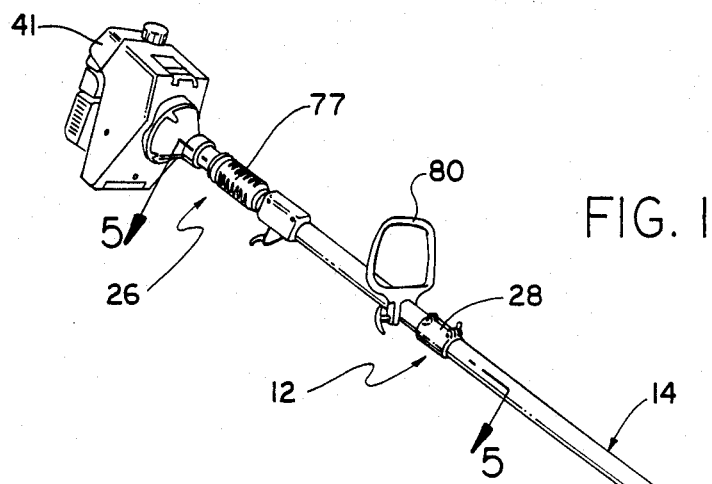
FIG. 1
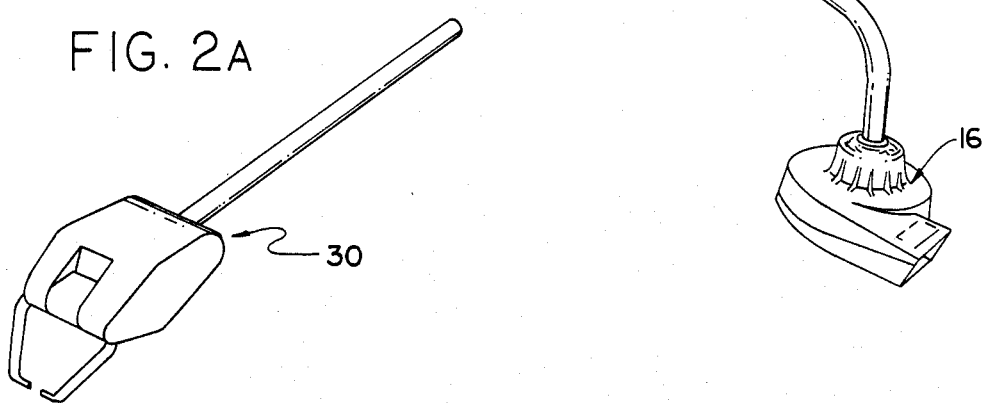
FIG. 2A
FIG. 2B
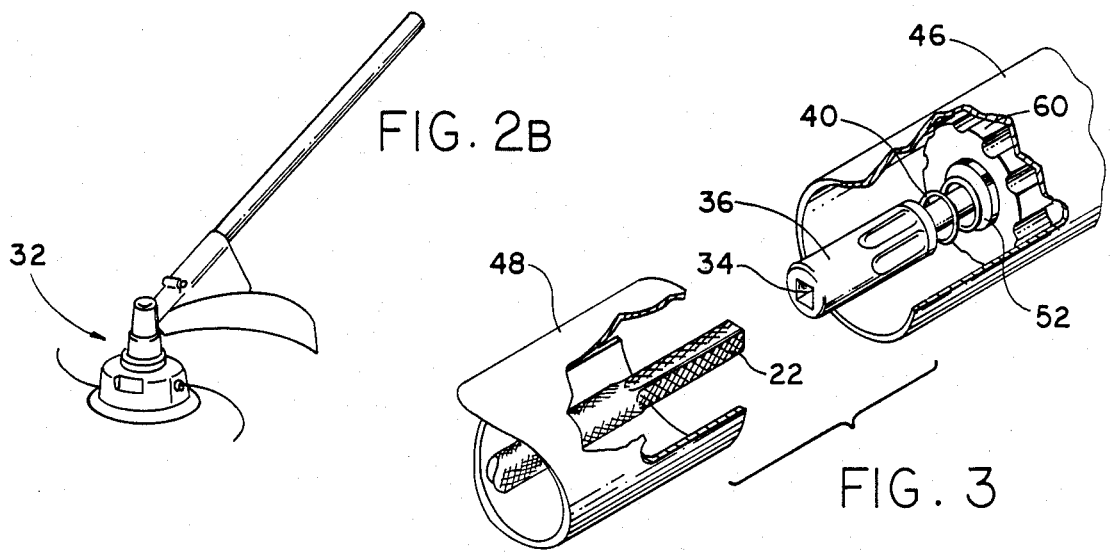
FIG. 3

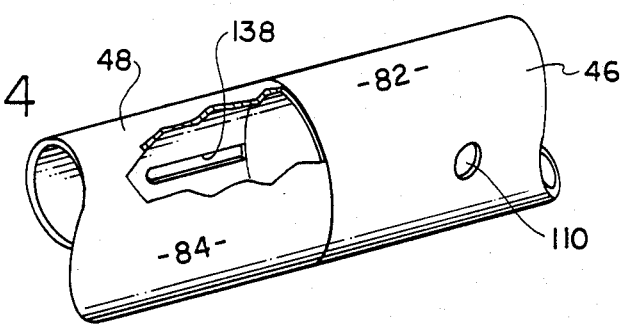
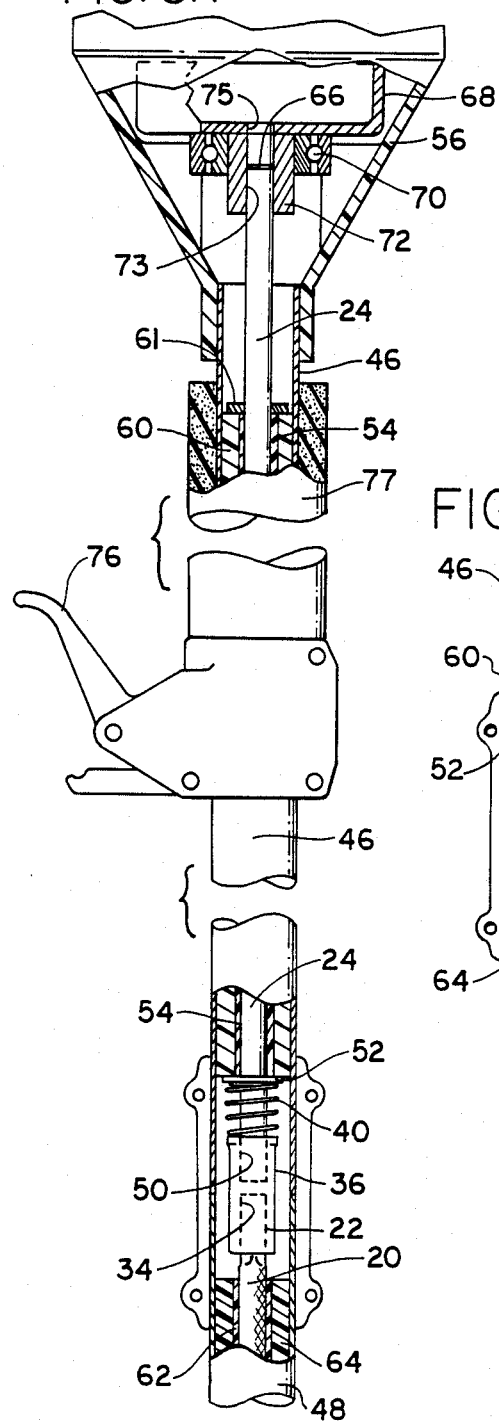
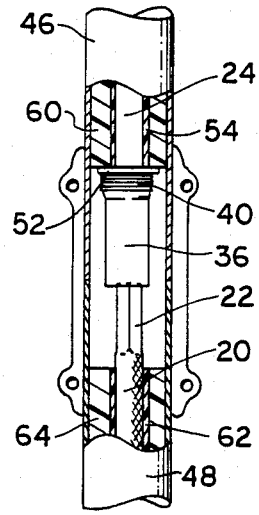
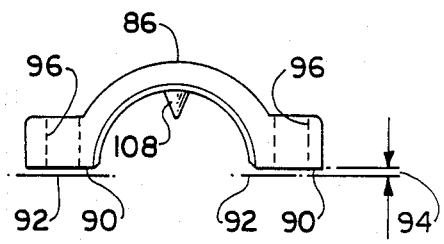
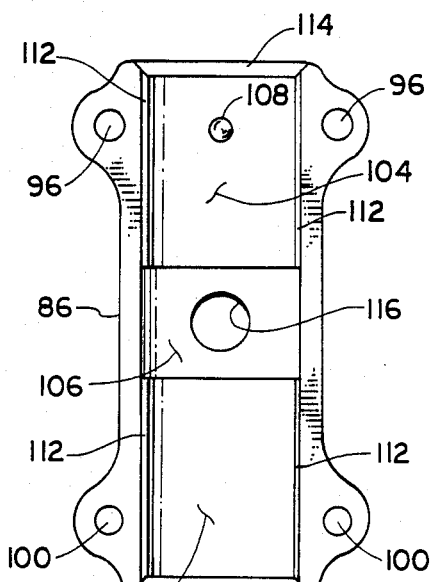
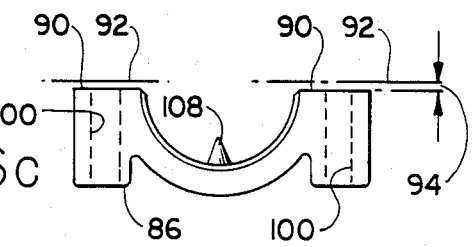

TOOL DRIVE ASSEMBLY AND CLAMP

This is a continuation of co-pending application Ser. No. 608,332 filed on May 8, 1984 now abandoned.

FIELD OF THE INVENTION

The invention pertains to the field of drive assemblies for power tools, for example, power garden tools having long shafts. It also pertains to the field of clamping mechanisms for joining elongated members.

BACKGROUND OF THE INVENTION

Power tools, for example, power garden tools having long shafts, present interesting and, at times, subtle challenges in their assembly and use.

As one consideration, providing for compact storage and shipment, quick and convenient assembly and sturdy, long-term operation under sometimes extreme conditions, brings to bear requirements which, to a significant extent, tend to be contradictory. In this regard, Hampel, U.S. Pat. No. 4,397,088, is illustrative.

Hampel specifically provides for a two-piece hollow handle having pieces which are held together by a sleeve having semi-circular halves. In assembly, the handle pieces are telescoped and the sleeve halves are joined using, e.g., screws and bolts. Protrusions (lugs) along the inside of the sleeve halves fit in holes along the telescoped handle pieces. The protrusions, along with abutting sleeve halves, are stated to be clearly preferred, due to sturdiness requirements, over the conceptually adverted to alternative of utilizing gripping action provided by joined sleeves (column 3, lines 37–54, and column 4, lines 24–32).

Somewhat related to this, for example, on tools using a long flexible shaft and a two-piece handle joined without telescoping the handle pieces, other forms of internal protrusions have been employed. According to one form, a circumferentially elongated protrusion along the inside of one of the sleeve halves is received in a similarly circumferentially extending opening in the lower handle piece. For the top handle piece, there would typically be a lug or pin-like protrusion (key) and a hole to closely fit about such protrusion. A single wing screw, at the lower end of the sleeve, for example, has been employed to somewhat speed the assembly and disassembly process. However, it is evident that, so far as this is concerned, from a practical standpoint, there is little difference between this and what is shown in Hampel. Moreover, with the circumferentially extending protrusion and opening, typically, some room is left for rotation of the lower handle piece and operating head of the tool with respect to the upper handle piece, for example, if the operating head bumps into an object. This, however, is considered to be a substantial detriment from the point of view of sturdiness and safety.

Yet further, along somewhat similar lines, two-piece shafts, in the past, have been found useful in power tools of various varieties, including garden tools.

With regard to holding or joining mechanisms along the general lines shown in Hampel and discussed above, consideration and effort has gone into incorporating quick-change features - i.e., attempting to provide for quick substitution of different operating heads with regard to a single operator end of a tool. One such proposal would employ a pin or lug-like protrusion along the inside of a sleeve piece to be received in an L-shaped ("bayonet") opening having a long leg opening at the upper end of a non-telescoped lower handle piece, and utilizing the single wing screw noted above. This approach, so far as known, has not been adopted. Disadvantages relating to ease and quickness of connection and disconnection of the head and rotation of the head end with regard to the user end, e.g., upon bumping into an object, as explained above, remained.

With regard to changing alternative tool heads, although related to general tool assembly, additional important considerations come into play. Specifically, ease and rapidity are enhanced in importance because the operation may be repeated hundreds of thousands of times during the life of the tool rather than merely, e.g., after initial shipment, long-term storage or repair. Related to this is the desire for simplicity, not only to contribute to such rapidity, but also to avoid mistakes which are much more likely to crop up in the hundreds or thousands of changes over the life of the tool. Such mistakes, at a minimum, can eliminate the sturdiness required for effective operation, and, at the other extreme, present a grave danger to the operator or some other individual in the vicinity of the tool.

Considered in a somewhat broader framework, the present situation involves several areas of concern. It generally involves mechanical interfacing which is employed in the connection of parts that rotate with one another during operation. It also generally involves the joining of parts through sleevelike devices.

As to this framework, and the interfacing aspect, Walker, U.S. Pat. No. 3,080,185, provides a mechanism for assembling a radio face plate with a knob thereon on a radio chassis, even though the part, on the chassis, which the knob is to control, is not turned to the position required for connection with the knob mechanism. The connection mechanism incorporates a spring-loaded part which, ultimately, receives the part on the chassis which is to be controlled by the knob. Thomas, U.S. Pat. No, 1,695,564, Zaleske, U.S. Pat. No. 2,327,951, and Cadwallader, U.S. Pat. No. 2,425,992, show other spring-loaded connection mechanisms. In Thomas, apparently, correct rotational positioning is achieved by hand in a tool which can be either hand-driven or power driven. Zaleske and Cadwallader are of more limited interest and particularly relate to interconnection for control purposes.

Concerning such broader framework, and the sleeve-related aspect, Thomas, U.S. Pat. No. 907,539, provides sleeve halves, for joining two shafts which are to rotate with one another. Opposing inner surfaces, along each of two sleeve halves, are separated by less than the diameter of the shafts to provide pressure points against the shafts as the halves approach one another and are bolted to one another on the shafts. Near the pressure points, the inner surfaces of the sleeve halves have curvatures which substantially follow the curvature of the shafts. However, away from these points the inner surfaces recede from the shafts to provide spaces between the shafts and such inner surfaces.

Wuelker, U.S. Pat. No. 1,636,087, employs wing screws with respect to sleeve-like holding devices. It also employs various ways of connecting shafts, including split bushings; employs a flexible shaft with a sheath; and employs a tubular handle. Priest, U.S. Pat. No. 501,731, somewhat similarly, employs wing set screws with respect to a tubular sleeve associated with the connection between flexible and rigid shafts.

Murdock, U.S. Pat. No. 713,135, employs bolted-together, in the nature of sleeve portions, in conjunction with elongated triangular-shaped members, to frictionally hold two shafts.

Barker, U.S. Pat. No. 3,583,356, and Grace, U.S. Pat. No. 455,396, provide two-piece sleeves which are screwed or bolted together in joining two shafts, in the case of Grace, a rod-like and a flexible shaft. Firth, U.S. Pat. No. 3,068,665, Schwemlein, U.S. Pat. No. 1,656,992, Gay, U.S. Pat. No. 736,378, Tapley, U.S. Pat. No. 1,677,375 and MacKenzie, U.S. Pat. No. 3,851,983, also are of some, albeit limited, interest.

The present invention provides for compact storage and shipping of a tool, e.g., a garden tool with a long shaft. It also provides for rapid assembly and rapid substitution of alternative tool heads without any need for concern with split-shaft coupling by the user in such assembly or substitution. Along with such rapid assembly and substitution, it maintains great sturdiness of connection during operation. It accomplishes the foregoing in the detailed connecting interface between split-shafts and in the detailed clamping features for securing the user end and operating heads end of the tool.

SUMMARY OF THE INVENTION

In accordance with the invention, there is provided a self-coupling split-shaft drive assembly for a tool, which includes: a motor; a driver shaft; apparatus to couple the driver shaft to the motor; a driven shaft for rotational coupling to the drive shaft and having proper and improper orientations for such coupling; securing apparatus to secure the shafts independently of the orientation of the driven shaft; and coupler apparatus to rotatably couple the driven shaft, when secured in an improper orientation, to the driver shaft in response to the initiation of rotation of the driver shaft by the motor.

In accordance with other, related aspects of the invention, a self-coupling, split-shaft drive assembly for a tool, includes: a motor, a driver shaft, coupling apparatus and a driven shaft, as initially described above; and coupler apparatus to rotatably couple the driven shaft to the driver shaft, which includes a spring to bias the driver shaft and a socket member fixed to the driver shaft. The socket member moves with the driver shaft against the force of the spring under a force along the driven shaft, when in an improper orientation for coupling, and moves with the driver shaft under the return force of the spring upon the accomplishing of the rotational coupling of the shafts.

In accordance with yet other, related aspects of the invention, a split clamp, e.g., for use in the securing apparatus as initially described, is adapted for clamping elongated members which define generally right, circular, cylindrically-shaped outer surfaces. The split clamp includes a pair of clamp members, each of such members being shaped to fit about part of the periphery of the elongated members and each having a pair of faces to oppose the corresponding faces of the other clamp member. Such clamp members are formed, with respect to the elongated members, to an opposed face separation, of less than or equal to about 3.4 percent of the diameter for the elongated members. Connectors, then, are provided to join the clamp members about the elongated members. In accordance with more detailed features, the clamp members are formed, with respect to the elongated members, to an opposed face separation of greater than or equal to about 0.5 percent of the diameter for the elongated members.

In accordance with yet other more detailed features of the split clamp as initially described above, the clamp connectors as initially described include a first pair of connectors to join the clamp members toward one end of such members, which are adapted for tightening and loosening in manual fashion, and a second pair of connectors to join the clamp members toward the other end of such members, which are adapted for tightening and loosening by a tool. The clamp members, then, each have a first pair of openings for the first pair of manually-operated connectors and a second pair of openings for the second pair of tool-operated connectors. To substantially contribute to the convenience of operation of the clamp members in assembly and disassembly, in forming the clamp, the second pair of openings for the second pair of tooloperated connectors, are centered a distance that is less than or equal to about twenty percent of the length of the clamp member, from the tool-operated connector end of the clamp member.

In an embodiment, incorporating the various aspects of the invention, the clamp members are employed in the securing apparatus of the drive assembly, in association with a tubular, elongated member which extends about the driver shaft and a tubular elongated member which extends about the driven shaft. One of the clamp members, used as one of a pair of securing members, then includes an elongated ridge which, when the member is in assembled position, extends in substantially the direction of elongation of such a tubular elongated member; and the tubular elongated member correspondingly defines an elongated slot to receive the ridge.

BRIEF DESCRIPTION OF THE DRAWINGS

FIG. 1 is a perspective view of a garden tool in accordance with the invention.

FIGS. 2A and 2B show alternative operating heads for the tool of FIG. 1, usable with the same power or user end of the tool.

FIG. 3 is a perspective view from the side opposite that of FIG. 1 showing a part of the tool pulled apart, partially broken away with certain components removed.

FIG. 4 is the same view as FIG. 3 but not pulled apart, broken away in a different fashion with additional components removed.

FIG. 5A is a partially cross-sectional, partially elevational view, in part broken away, taken along the line 5—5 of FIG. 1, with the driver and driven shafts of the tool rotationally coupled to one another.

FIG. 5B shows a portion of FIG. 5A with the shafts not rotationally coupled due to an improper orientation.

FIG. 6A is a side view of the clamp member which is shown in FIGS. 5A and 5B, showing the inside of the clamp member from the same direction as FIGS. 5A and 5B.

FIGS. 6B and 6C are end views of the clamp member of FIG. 6A.

DETAILED DESCRIPTION

Figure 7C:
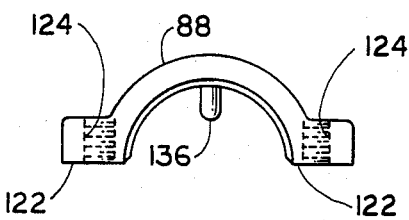
FIGS. 7B and 7C are end views of the clamp member of FIG. 7A.

Referring to FIGS. 1-8, there is shown garden tool apparatus incorporating both the drive assembly and clamp aspects of the invention.

In FIG. 1, the tool apparatus is assembled as a power air blower 12; thus, the operating head end 14 on the tool incorporates an air blower head 16. During operation, a generally circular, flexible driven shaft 20, having a squared-off coupling end 22, which is incorporated into the operating head end, is rotationally coupled to a generally circular flexible driver shaft 24, which is incorporated into the power (or user) end 26 of the tool (FIGS. 1, 5A and 3). A clamp 28 of special, detailed design is used in securing the head and power ends of the tool together (FIGS. 1, 6A, 6B, 6C, 7A, 7B, 7C and 8.) Any one of a number of different operating heads (and thus operating head ends) may be used with the same power end of the tool. In FIG. 2A, a weeder-cultivator head end 30, having blades that oscillate back and forth is shown as one alternative. In FIG. 2B, a string trimmer head end 32 is shown as another alternative. It incorporates a rotating head having strings which cut grass and weeds through rapid rotation. All of the head ends, of course, are essentially identical in the vicinity of where they would be secured to the power end of the tool by the clamp, both as to the flexible driven shaft and as to other elements.

To achieve rotational coupling of the flexible driven shaft 20 with the flexible driver shaft 24, the driven shaft must be in an orientation such that its squared-off end 22 will mate with a square bore 34 extending partially into a socket member 36 from the lower end of the socket member (FIG. 3). In FIG. 5B, the orientation was not proper for achieving such coupling. Despite this, the clamp 28 may be fully tightened, securing the operating head end to the power end of the tool for operation. This is assumed to be the situation in FIG. 5B.

Thus, it might be assumed that the weeder-cultivator head end 30 has just been removed and the air blower head end 14 has been clamped and secured in position, with, however, the driven shaft 20 not properly oriented for coupling, and, thus, not coupled to the drive shaft through the socket member 36. As a result, as shown in FIG. 5B, in contrast to FIG. 5A, the socket member, with the flexible driver shaft 24 fixed therein, has slid a short distance upward against the force of a biasing spring 40. So far as the user is concerned, the tool is ready for operation. The user, thus, has no concern with the situation with regard to the coupling or lack thereof. The reason is that upon start-up of the motor 41 and engagement of the clutch, coupling the motor to the driver shaft, the driver shaft will rotate the socket member to an orientation which will allow the driven shaft 20 to slip into the socket member's square bore 34, thus accomplishing the driver shaft-driven shaft coupling. As previously indicated, such coupling is shown in FIG. 5A.

As a companion to the avoidance of any concern by the user for proper shaft orientation in securing the tool together and starting up, the clamp 28, in interacting with other components, enbodies specific features which enable the removal of one operating head end and the substitution of another in extremely convenient, rapid fashion. While providing this, the clamp aspect also maintains great sturdiness at the point where the power and head ends are joined and is capable of withstanding the many removals and substitutions to be expected over the life of the tool. This is considered to be a significant factor which can be appreciated in light of the extreme forces and conditions which operating heads such as weeder-cultivators, with blades oscillating hundreds or thousands of times a minute, and rapidly rotating string trimmers, require the tool and clamp to endure.

Figure 8:
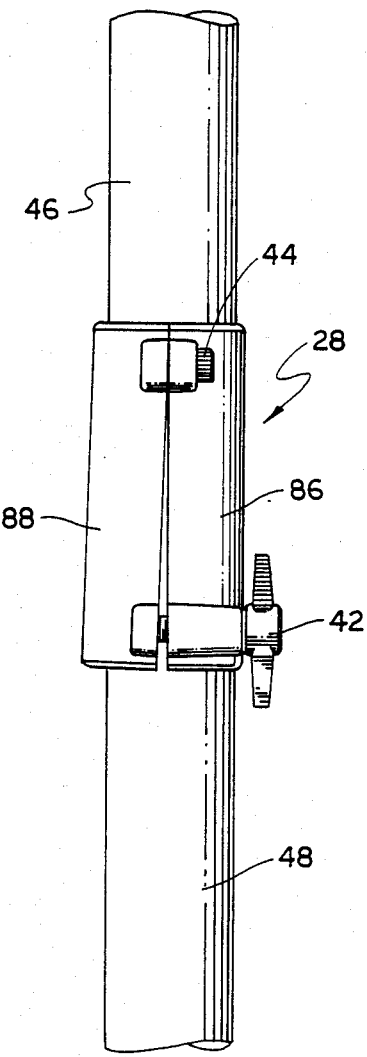
FIG. 8 is a broken away, top view of the tool of FIG. 1, showing the clamp members after being loosened for removal of one operating head end and the substitution of another (with the clamp separation greatly exaggerated).

Referring to FIG. 8, the loosening of the clamp 28 for removal of one head end and substitution of another is accomplished by simply loosening two essentially identical wing screws 42 (one shown) at the lower end of the split clamp. Though these two have been loosened, two essentially identical screws 44 (one shown), which are adapted to be tightened and loosened by a tool, have not been loosened and maintain the upper ends of the clamp members tightly joined. A head end can be removed and a new head end substituted in this fashion. Then with the wing screws tightened down, the tool is again ready for operation. The specific tool-operated screws of the embodiment conveniently are Allen screws.

The separation in FIG. 8 of the two clamp members of the split clamp 28, with the wing screws loosened, is greatly exaggerated for ease of understanding. Specifically, the clamp members are designed, with respect to the outer diameter of a driver shaft tube 46 and a driven shaft tube 48, to a separation for their opposing faces of a very small percentage of such diameter—specifically, in the range of less than or equal to about 3.5 percent of such diameter and greater than or equal to about 0.5 percent of such diameter. At the same time, in accomplishing the desired goals, the openings for the tool-operated screws in the clamp members are centered a distance from the upper ends of the clamp members which is less than or equal to about 20 percent of the length of the clamp members. These factors are considered to be of importance in achieving such goals, including a clamp of sufficient sturdiness and frictional holding power when tightened. The specific distance in the presently-preferred embodiment, is about 13 percent of such length.

Now some of the features already addressed will be described in additional detail and other related features will also be described in detail.

Turning to the shaft coupling interaction apparent in FIGS. 5A, 5B and FIG. 3, and referring specifically to FIGS. 5A and 5B, as already indicated, the flexible driver shaft 24 is fixed in the socket member 36. In this respect, the socket end of the driver shaft, as with the driven shaft, is squared-off. However, in this case, a round socket bore 50, extending from the upper end of the socket 36, part way in, is sized such that the squared-off end of the driver shaft can only be tightly squeezed (swedged) in the socket member, to provide, essentially, a permanent connection.

A thrust washer 52 is provided at the upper end of the biasing spring 40. Above the thrust washer, the power end of the tool 26 employs a conventional tubular liner 54 of a plastic material about the driver shaft 24. This liner extends upward to the vicinity of a clutch housing 56, near the motor 41. There is then a conventional spacer 60 of a rubber material, along the liner, between the liner and the drive shaft tube 46. At the upper end of the spacer, a washer-like palnut 61, tightly fixed on the driver shaft, blocks any downward sliding of the driver shaft below the position of FIG. 5A.

There is a corresponding operating head end tubular liner 62 and spacer 64 of the same materials as for the power end, serving essentially the same functions as for the power end. The particular operating connections into the various operating heads of the various operating head ends, including the driven shaft connections, which are not shown, can be readily accomplished along conventional lines, and form no part of the present invention.

Still referring to FIG. 5A, the clutch housing 56 is shown there with the motor absent. Its interior also is shown somewhat schematically with certain conventional parts removed, for purposes of clarity. Of primary interest, and as already indicated, the upper end 66 of the driver shaft 24 slides upward with the movement of the socket member 36 to the socket member's position of FIG. 5B, and back downward with the return of the socket member to the socket member's position of FIG. 5A. This end of the driver shaft also is squared-off, as will be described in more detail below.

The clutch is a conventional centrifugal clutch employing a clutch drum 68 (with the members which fly out to engage the inside of the drum, not shown). A conventional ball bearing 70 is press-fit inside the clutch housing (the details of such clutch housing press-fit not shown). An arbor 72, which is fixed to and may be integral with the clutch drum, is press-fit inside the ball-bearing. A snap-ring (also not shown) may be snap-fit about the arbor against the ball-bearing 70, as an added precaution to maintain the ball-bearing in its press-fit position. As can be readily appreciated, these aspects are fully conventional.

The squared-off upper end 66 of the driver shaft 24 slideably fits in a square opening 73 through the arbor. With the spring 40 compressed, as in FIG. 5B, the top of the driver shaft slides into a square opening 75 through the clutch drum base so it is approximately flush with the floor of the clutch drum. With the spring in its normal biasing state of FIG. 5A, about half of the squared-off upper end of the driver shaft is below the arbor and about half of it extends into the arbor. Of course, it will be evident that detailed aspects of this can be readily varied, as convenient, without affecting the mode of operation.

The motor, or engine, is of a fully conventional type. Specifically, a one-horse power, one cylinder, two-cycle, air-cooled, recoil starter gasoline engine sold by Zenoah Company has been found to be convenient and satisfactory. The throttle lever 76 for the engine is shown in FIG. 5A. From the foregoing, it will be apparent that, with the operating head end 14 secured to the power end 26 by the clamp 28 with, however, the driven shaft 20 in an improper orientation for coupling in the socket member 36, as illustrated in FIG. 5B, the coupling will occur after start up as the throttle lever 74 is pushed to cause the engagement of the centrifugal clutch and the rotation of the driver shaft 24. Referring to FIG. 1 and FIG. 5A, a hand grip 77 of a rubber material is provided for one hand of the user, near the motor; and, referring to FIG. 1, a handle 80 is provided somewhat lower for the other hand.

Now again turning to the clamp aspects, it should be reemphasized, particularly with regard to FIG. 8, that the tightening and loosening of the clamp members for removal of one operating head end and substitution of another, is accomplished solely manually through the wing screws 42. Thus, no tool is required for this purpose, to loosen or tighten the tool-operated, e.g., Allen screws 44. Thus, the clamp members can be essentially permanently secured on the power end of the tool at the factory or during initial assembly and the user, essentially, need not be concerned with this in effectively changing the tool by changing the operating head end.

As is apparent in FIGS. 3 and 4, the driver shaft tube 46 and driven shaft tube 48 have generally right circular, cylindrically-shaped outer surfaces 82 and 84 along portions of the tubes which interact with the clamp 28 (and along much more or all of their lengths). The right clamp member 86 (with reference to the view of FIG. 1 looking up from the operating head) is shown in detail in FIGS. 6A–6C and the left clamp member is shown in detail in FIGS. 7A–7C.

Referring first to the right clamp member 86 as shown in FIG. 6A–6C, that clamp member is formed to essentially a full, half-clamp and full, half-right internal cylindrical surfaces(apart from the slight chamfering as shown) except for the absence of a thin slice at the pair of flat faces 90 of the clamp member. These, of course, are the faces which are adapted to oppose corresponding faces of the left clamp member. The absence of this thin slice is represented by the two dashed-dotted lines 92 and the arrows 94. As indicated, these faces are essentially perpendicular to the axes of the openings through the clamp member for the wing screws 42 and for the tool-operated, e.g., Allen screws 46 (see also FIG. 8). There, of course, is a pair of holes 96 for the tool-operated screws, toward the upper end and a pair of holes 100 for the wing screws, toward the lower end. Such holes in the right clamp are not threaded.

Along the inside of the clamp member 86, there is a lower, right circular cylindrically-shaped internal surface and an upper, right circular cylindrically-shaped internal surface 104. The diameter for these, of course, is designed to approximate the outer diameter of the shaft tubes 46 and 48. A middle, right circular cylindrically-shaped internal surface 106 is recessed somewhat (thus, based on a somewhat larger diameter). The shaft tubes come together in this area. Further, this recessing can be used, for example, to provide a raised serial or part number along such surface without the raised number interfering with the operation of the clamp.

There is a generally conical pin 108 toward the upper end of the clamp, protruding inwardly along the upper internal cylindrically-shaped surface 104. This pin locks this right clamp member 86, and when the left clamp member is bolted to this clamp member, also the left clamp member, in position on the driver shaft tube 46 by insertion in a mating circular opening 110 through such tube (FIG. 4).

As indicated in FIGS. 6A–6C, there are narrow conventionally chamfered surfaces 112 between the faces 90 of the member and the upper and lower cylindrically-shaped internal surfaces 102 and 104. Similarly, there are other narrow conventionally chamfered end surfaces 114 between the ends of such internal surfaces and the ends of the member itself. There also is a circular opening 116 along a portion of the length of the member which provides a sighting opening to the intersection of the shaft tubes 46 and 48 (FIG. 4).

Figure 7A:
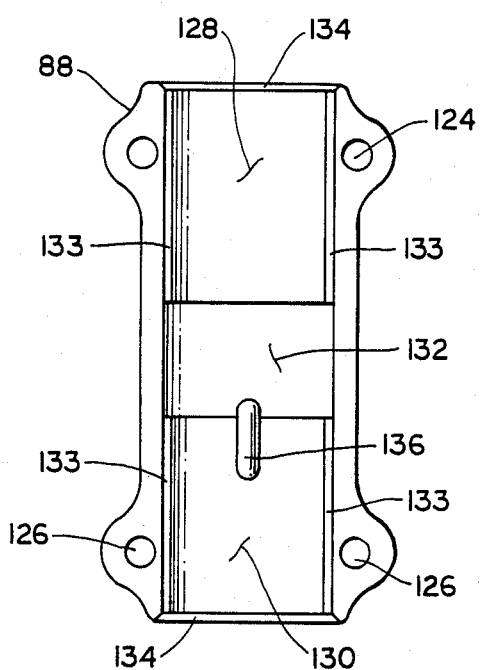
FIG. 7A is a side view showing the inside of the clamp member which opposes the clamp member of FIGS. 5A and 5B, from the opposite view of FIGS. 5A and 5B.
Figure 7B:
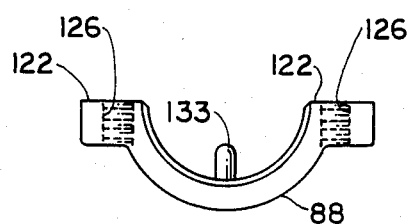

Now turning to the left clamp member 88, as shown in detail in FIGS. 7A–7C, as indicated there, for this clamp member, a thin slice is not removed. Thus, in this case, the clamp member is a full, half-clamp and the flat clamp faces 122, perpendicular to the axes of the screw openings through the clamp, represent the edges of a full, semi-circular cross section. Thus, in the present embodiment, it is the absence of a thin slice on the right clamp which is employed in the designed face separation for the clamp members. The upper openings 124 for the tool-operated screws and lower openings 126 for the wing screws, in this case, of course, are internally threaded.

As with the right clamp member 86, there is an upper, right circular cylindrically-shaped internal surface 128, a lower, right circular cylindrically-shaped internal surface 130 and a slightly recessed middle, right circular cylindrically-shaped internal surface 132. There are also similar narrow chamfered surfaces running in the direction of the length 133 and at the ends 134 of the member. As previously indicated, such narrow chamfered surfaces are conventionally provided in devices of this general type.

Somewhat toward the lower end of the left clamp member 88 there is an elongated ridge 136 protruding along the inside of the member. In this regard, an elongated opening 138 running in from the end of the lower shaft tube 48 (FIG. 4) slides along this ridge when an operating head end is slid in or out of the clamp 28. This ridge-opening structure prevents any tendency of the operating head end to rotate, when it bumps an object, or under other circumstances; it also, of course, insures the proper head orientation. At the same time, it does not interfere with the extremely advantageous method of removing one operating head end and substituting a different one, which is provided by the clamp and related components.

The thinness of the omitted slice in the design of the right clamp member 86, as represented by the broken lines 92 and arrows 94, has been indicated in the initial part of this description. There, the designed separation of the clamp members' opposing faces, as a percentage with regard to the outer diameter of the shaft tubes is noted (such shaft tube diameter, of course, being designed to approximate the inner diameter for the lower and upper internal surfaces 102, 104, 128 and 130 of the two clamp members). Similarly, the center position for the holes 96 and 124 for the tool-operated screws, as a distance from the upper ends of the members, stated as a percentage of the lengths of the members (such lengths being identical) has also been stated.

In accordance with this, in a specific embodiment, the outer diameter for the shaft tubes 46 and 48 is 1.00 inch with a tolerance of plus 0.004 inch and minus 0.000 inch; at the same time, the radius on which the upper and lower internal cylindrical surfaces for each clamp member is based, is 0.500 inch with a tolerance of plus 0.005 inch and minus 0.005 inch. The thickness of the absent slice for the right clamp member is then less than or equal to 0.020 inch and greater than or equal to 0.015 inch. Such thickness for the absent slice, with respect to such shaft tube diameter (and clamp member internal cylindrical surface radius), is critically specified and has been found to be important to the desired operation of the clamp. These figures then provide for a maximum clamp face separation of about 3.4% of the shaft tube diameter and a minimum of about 0.5%. The maximum is from: a maximum tube diameter of 1.004 inch; a minimum 0.990 inch diameter basis for the clamp member upper and lower internal cylindrical surfaces; and a maximum absent clamp slice thickness of 0.020 inch. The minimum is from: a minimum tube diameter of 1.000 inch; a maximum 1.010 inch diameter basis for the clamp member upper and lower internal cylindrical surfaces; and a minimum absent clamp slice thickness of 0.015 inch.

The initially-stated range for the center position of the holes for the tool-operated screws, as may be appreciated, is related to the clamp face separation range, relating to the absent clamp member slice. In the specific embodiment, just referred to, the distance of the centers for these holes from the upper ends of the clamp members is about 13% of the length of the clamp members. With this percentage, in the specific embodiment, the following additional dimensions have been employed: length of clamp members—3.50 inches; distances from each end of clamp member to middle internal surface—1.375 inches; length of internal middle surface—0.750 inch; chamfered end surfaces—0.080 inch wide at a 15° angle; width of chamfered surfaces along length of member—0.025–0.030 inch at a chamfer angle of 30°.

It may also be noted that, with regard to the specific application described herein, a clamp length ranging between about 3 and 5 inches is considered to be practical from a functional and cost standpoint. This considers the necessary support which is required in the securing, the amount of friction that can be tolerated in the sliding in and out, between the clamp members, of a driven shaft tube, and cost and weight considerations.

The shaft tubes as well as the clamp members advantageously are made of aluminum materials to combine strength and lightness. As a further note, it will be appreciated that the design for the clamp members provides that the right clamp member, in position, fits about a part of the periphery of the shaft tubes that is slightly less than the part of the periphery that the left clamp member fits about.

Finally, it should be apparent that if, for example, the driven shaft were fixed in a socket member and the coupling of the shafts were achieved by the driver shaft sliding into a square bore of the socket member, the proper and improper orientations of the driven shaft for such coupling would be by reference to orientations of the square bore in the socket member fixed to the driven shaft.

It, of course, will be appreciated by those skilled in the art that changes and modifications in various of the details of the embodiment which has been described, may be made without departing from the spirit or scope of the invention.

What is claimed is:

1. A self-coupling split-shaft drive assembly for a tool comprising:
   a motor;
   a driver shaft;
   means to couple said driver shaft to said motor;
   a driven shaft for rotational coupling to said driver shaft having proper and improper orientations for said coupling;
   coupler means to rotatably couple said driven shaft to said driver shaft, said coupler means including,
      a spring to bias said driver shaft, and
      a socket member fixed to said driver shaft to move with said driver shaft against the force of said spring under a force along said driven shaft in an improper orientation and to move with said driver shaft under the return force of said spring upon said rotational coupling of said shafts ;
   said driver shaft being a shaft of substantial length and extending from a substantial distance away from said socket member.

2. A drive assembly as defined in claim 1 further comprising:
   a tubular elongated member to extend about said driver shaft;

a tubular elongated member to extend about said driven shaft;

a pair of securing members each shaped to fit about part of the periphery of said elongated members; and connectors to join said securing members about said elongated members.

3. A drive assembly as defined in claim 2 wherein:

said tubular elongated members define generally right, circular cylindrically-shaped outer surfaces along portions for fitting said securing members; and each of said pair of securing members has a pair of faces to oppose the pair of faces of the other securing member, and said securing members are formed, with respect to said elongated members, to an opposed face separation of less than or equal to about 3.4 per cent of the diameter for said elongated members.

4. A self-coupling split-shaft drive assembly for a tool comprising:

a motor;

a driver shaft;

means to couple said driver shaft to said motor;

a driven shaft for rotational coupling to said driver shaft having proper and improper orientations for said coupling;

securing means to secure said shafts independently of the orientation of said driven shaft, including, a tubular elongated member to extend about said driver shaft, a tubular elongated member to extend about said driven shaft, a pair of securing members each shaped to fit about part of the periphery of said elongated members, and connectors to join said securing members about said elongated members, a said securing member and a said elongated member including a projection, and having structure defining an elongated space to receive said projection and to prevent rotation of said elongated member in said securing members; and coupler means to rotatably couple said driven shaft secured in an improper orientation to said driver shaft in response to the initiation of rotation of said driver shaft by said motor.

5. A drive assembly as defined in claim 4 wherein said projection comprises an elongated ridge.

6. A drive assembly as defined in claim 5 wherein said elongated ridge is adapted to extend in substantially the direction of elongation of said tubular elongated member associated with said ridge and elongated space.

7. A drive assembly as defined in claim 4 wherein said tubular elongated member associated with said projection and elongated space is said tubular elongated member to extend about said driven shaft.

8. A drive assembly as defined in claim 4 wherein said elongated space extends from an end of said tubular elongated member or of said securing member associated with said projection and elongated space.

9. A drive assembly as defined in claim 4 wherein:

said elongated space comprises an elongated slot defined by said tubular elongated member associated with said projection and space, through said tubular elongated member; and said projection comprises an elongated ridge included on said securing member associated with said projection and elongated space, adapted to extend in substantially the direction of elongation of said tubular elongated member associated with said projection and elongated space.

10. A drive assembly as defined in claim 4 wherein said coupler means includes:

a spring to bias said driver shaft; and a socket member fixed to said driver shaft to move with said driver shaft against the force of said spring under a force along said driven shaft in an improper orientation and to move with said driver shaft under the return force of said spring upon said rotational coupling in response to said initiation of rotation by said motor;

said driver shaft being a shaft of substantial length and extending from a substantial distance away from said socket member.

11. A drive assembly as defined in claim 10 wherein said driver shaft extends from the vicinity of said motor.

12. A drive assembly as defined in claim 1 wherein said driver shaft extends from the vicinity of said motor.

13. A self-coupling split-shaft drive assembly for a tool comprising:

a motor;

a driver shaft;

means to couple said driver shaft to said motor;

a driven shaft for rotational coupling to said driver shaft having proper and improper orientations for said coupling;

coupler means to rotatably couple said driven shaft to said driver shaft, said coupler means including, a spring to bias one of said driver and driven shafts, and a socket member fixed to said one of said driver and driven shafts to move with said shaft against the force of said spring under a force along said other one of said driver and driven shafts in an improper orientation and to move with said one of said driver and driven shafts under the return force of said spring upon said rotational coupling of said shafts;

said one of said driver and driven shafts being a shaft of substantial length and extending from a substantial distance away from said socket member.

14. A drive assembly as defined in claim 13 further comprising:

a tubular elongated member to extend about said driver shaft;

a tubular elongated member to extend about said driven shaft;

a pair of securing members each shaped to fit about part of the periphery of said elongated members; and connectors to join said securing members about said elongated members.

15. A drive assembly as defined in claim 14 wherein:

said tubular elongated members define generally right, circular cylindrically-shaped outer surfaces along portions for fitting said securing members; and each of said pair of securing members has a pair of faces to oppose the pair of faces of the other securing member, and said securing members are formed, with respect to said elongated members, to an opposed face separation of less than or equal to about 3.4 per cent of the diameter for said elongated members.

16. A drive assembly as defined in claim 4 wherein said coupler means includes:

a spring to bias one of said driver and driven shafts; and a socket member fixed to said one of said driver and driven shafts to move with said shaft against the force of said spring under a force along said other one of said driver and driven shafts in an improper orientation and to move with said one of said driver and driven shafts under the return force of said spring upon said rotational coupling in response to said initiation of rotation by said motor;

said one of said driver and driven shafts being a shaft of substantial length and extending from a substantial distance away from said socket member.

* * * * *

UNITED STATES PATENT AND TRADEMARK OFFICE
CERTIFICATE OF CORRECTION

PATENT NO. : 4,733,471

DATED : March 29, 1988

INVENTOR(S) : Jon A. Rahe

It is certified that error appears in the above-identified patent and that said Letters Patent is hereby corrected as shown below:

Column 4, line 17, "tooloperated" should be -- tool-operated --

In the Abstract, line 21, "clamp member" should be -- clamp members --.

Signed and Sealed this

Eighth Day of November, 1988

Attest:

DONALD J. QUIGG

*Attesting Officer*        *Commissioner of Patents and Trademarks*